Figures 1, 2:
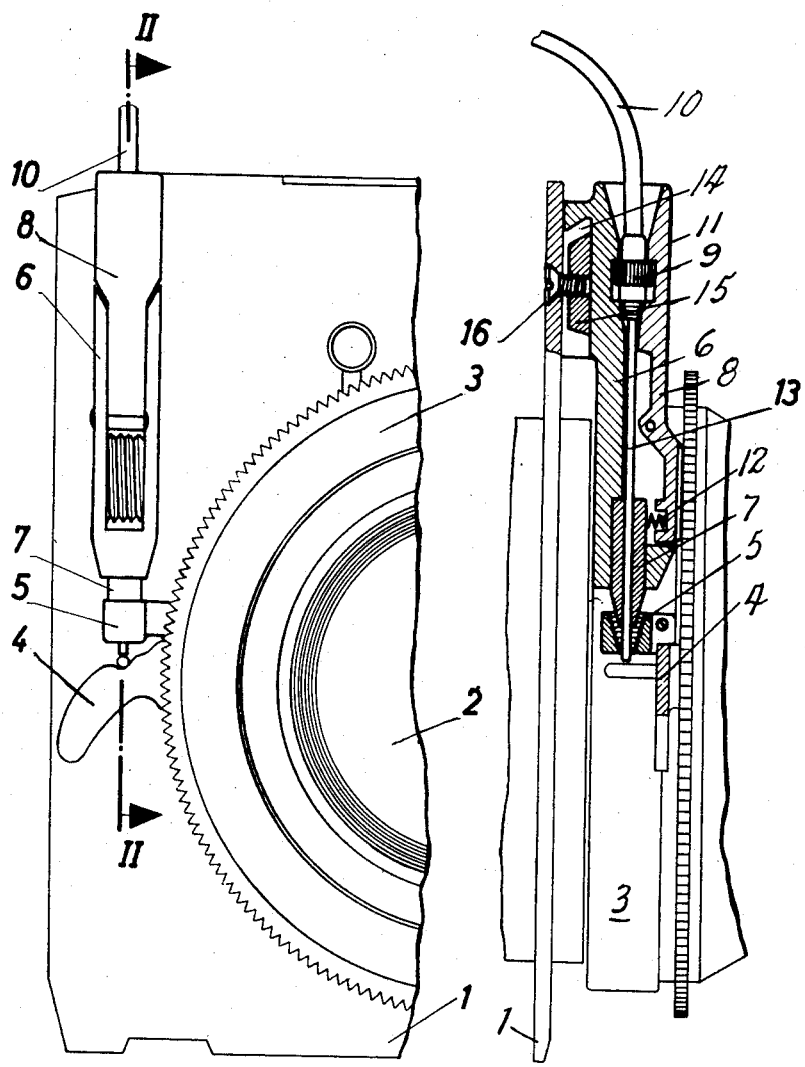

Inventor
Nikolaus Karpf

United States Patent Office 3,200,728
Patented Aug. 17, 1965

3,200,728
CABLE RELEASE CONNECTORS FOR
CAMERA SHUTTERS
Nikolaus Karpf, 45 Rupert Mayer Strasse,
Munich 25, Germany
Filed June 18, 1962, Ser. No. 203,169
Claims priority, application Austria, June 24, 1961,
A 4,899/61
7 Claims. (Cl. 95—53)

The connection of a cable shutter release to a camera or a shutter is generally effected by screwing a threaded end piece of the cable release either into a connecting nipple which is mounted directly on the shutter housing (which is the case for most cameras with extensible baseboards) or into a correspondingly screwthreaded hole in a shutter release mechanism which is mounted at a suitable position on the camera housing. The latter is generally the case with viewing hood cameras. Conical screwthreads are usual for connecting the cable shutter release so that, when an excessively high pull is exerted, the screw connection is freed and the connecting nipple is not torn from the shutter housing and no other damage is done. In addition, the conical screwthread facilitates mating the screw connection.

Nevertheless, this is often cumbersome and time consuming, especially in the cases of all those cameras wherein the cable shutter release connecting nipple is mounted on the shutter housing. Whenever the objective is changed the cable shutter release (the other end of which is often connected to the grip of a camera or to the head of a tripod) must be unscrewed from the connecting nipple of the one shutter and screwed into that of the other shutter. When working with gloves or in strongly vibrating vehicles such as aeroplanes, this is very difficult. Also, in many cases the connecting nipple for the cable shutter release is accessible with difficulty, for example in the case of wide angle lenses for cameras with baseboards where the lenses are mounted on lens panels.

The invention aims at providing a cable shutter release connection which permits rapid and easy connection of the cable shutter release to a photographic camera or to a shutter and which is sure to release the cable when the pull is excessive. This problem is solved by means of a cable shutter release connecting piece which has at least one resiliently yielding holding element which retains the inserted end piece of the cable shutter release by a clamping action.

In further aspect of the invention, the resiliently yielding holding element may be arranged in an intermediate member which can be connected to conventional connecting nipples for cable shutter releases and which comprises a transmission element for the cable shutter releasing stroke. Further, the holding element may be formed by spring biased tongs. Preferably, the open ends of the limbs of the tongs form a conical insert opening behind which projections are provided on the limbs of the tongs which drop into place behind the inserted end piece of the cable shutter release and hold the latter. The clamping effect of the holding element may, according to a further feature of the invention, be such that, on the one hand, the resistance to release of the photographic shutter is overcome but that on the other hand the holding element yields in the sense of freeing the end piece of the cable shutter release when the tension is too high. According to a further feature of the invention, the intermediate member may comprise connecting elements which permit it to be mounted to a lens panel. Preferably, and in accordance with the invention, the housing portion of the intermediate member may have a conically tapered bushing at its front for fitting into a conventional shutter release connecting nipple, and a slot at the back in which a nut is displaceable so that corresponding adjustment and connection of the housing portion is possible by means of a single connection screw which passes through a lens panel and engages in the nut.

An example of the invention is illustrated in the accompanying drawing. For this purpose, connection of the cable shutter release directly to a shutter has been chosen. However, the invention is not intended to be restricted to this. FIG. 1 shows a front view of part of a shutter mechanism with the shutter release attached and FIG. 2 is a section on the line II—II of FIG. 1.

1 designates a lens panel 2 an objective mounted thereon and 3 an intermediate shutter. As usual, a connecting nipple 5 having a conical internal screwthread is mounted at the periphery of the shutter housing above a finger release 4.

In a manner described hereinafter, a cable release connector is mounted on the lens panel 1. This connector is generally tong-shaped. One limb of the tongs is formed by an elongated substantially vertically arranged housing member 6 which terminates at the lower end in a bushing 7 having a conically tapered end. The conical portion of the bushing 7 fits into the connecting nipple 5. The second limb of the tongs is a complementary member 8 which lies snugly adjacent and pivoted to the housing member 6 and slightly projects forwardly thereof only at the lower end. At their upper ends, the housing member 6 and the complementary member 8 form a conical insert opening for a locating collar element 9 of a cable release 10. At the narrowest portion of this insert opening, projections 11 are provided on the members 6 and 8, such projections dropping into place behind the inserted locating collar element 9 of the cable release. It will be seen from FIGURE 2 that a recess is thus provided in each of the member 6 and the complementary member 8, and these recesses co-operate in the closed position of the members to form a chamber which receives and retains the locating collar 9. A spring is mounted between the housing member 6 and complementary member 8 below the pivot point of the complementary member 8. A pin 13 serving as a transmission element for the stroke of the cable release is introduced through the bushing 7 and through the central portion of the housing member 6. Its length is such that, when the bushing 7 is inserted in the connecting nipple 5, one end of the transmission element lies on the finger release 4 and the other end on the release pin of the cable release 10.

At the back of the housing member 6, a conical nut 15 is displaceably guided in a conical slot 14. Engaging in the nut is a connecting screw 16 which passes through the lens panel 1 at a suitable position. This enables the cable release connector to be mounted very simply on practically any lens panel and to be used for all shutter sizes, it being possible to effect such mounting on existing cameras. For assembly, the screw 16 is engaged in the nut 15 and the entire connector is then displaced and turned until the bushing 7 projects into the connecting nipple 5. The cable release connector remains on the lens panel 1.

The function and advantages of the above described cable release connector according to the invention will be immediately evident. The locating collar element 9 of any desired conventional cable release regardless of whether it has a conical or cylindrical screwthread is introduced into the conical insert opening. This causes the fitting 8 to pivot against the action of the spring 12 until the narrowest portion has been passed. The projections 11 will then fall into place behind the locating collar element of the cable release and retain same.

Pressure exerted on the lower projecting portion of the fitting 3 will release the locating collar element again.

I claim:

1. In a cable release connector for a camera shutter, a first rigid member fixed to the camera shutter, and a complementary rigid member movable relative to the first member, the said members each having a recess, the two recesses in combination being adapted to receive a locating collar element of the cable release connector, the said members being movable between a closed position in which the locating collar element is prevented from being withdrawn from the recesses and an open position in which the locating collar element can be withdrawn, resilient means connected between the first member and the complementary member and arranged to urge the latter towards its closed position, an operating surface on the complementary member positioned so that pressure applied to the said surface can move the member from its closed to its open position, thereby releasing the locating collar element, and a transmission element arranged to transmit the stroke of the cable release to the shutter.

2. The cable release connector of claim 1 wherein the first member and the complementary member have tapering entry guide surfaces at their ends remote from the shutter mechanism, whereby entry of the locating collar element of the cable release connector into the said recesses is facilitated.

3. The cable release connector of claim 2 comprising a pivotal mounting connecting the complementary member to the first member, the pivotal mounting being located between the operating surface and the end of the complementary member having the tapering entry guide surface.

4. The cable release connector of claim 3 comprising a compression spring located in proximity to the operating surface and arranged to urge the complementary member about said pivotal mounting in a direction towards its closed position.

5. The cable release connector of claim 4 comprising fastening elements arranged to secure the first member to a lens panel of the said camera shutter.

6. The cable release connector of claim 5 wherein the fastening elements consist of a tapering nut co-operating with a correspondingly tapering slot, whereby a plurality of adjustment positions of the first member relative to the lens panel can be obtained.

7. A cable release connector for a camera shutter comprising: a first rigid member; fastening elements arranged to fasten the said member to a lens panel of a camera shutter; a complementary rigid member pivotally mounted on the first member at a point intermediate the ends of the complementary member; the mounting being such that the complementary member can pivot relative to the first member between a closed position and an open position; a wall in said first member defining a first recess; a wall in said complementary member defining a second recess; the first and second recesses being located so as to form in the closed position of the members a chamber for receiving and retaining a locating collar element secured to the end of the cable release adapted in operation to be secured to the camera; resilient means connected between the first member and the complementary member and arranged to urge the complementary member towards the said closed position; an operating surface on the complementary member positioned so that pressure applied to the said surface can move the members from their closed to their open position, thereby releasing the locating collar element; and a transmission element arranged to transmit the stroke of the cable release to the shutter.

References Cited by the Examiner

UNITED STATES PATENTS 828,815   8/06   Edwards _____ 74—502

JOHN M. HORAN, *Primary Examiner.*